United States Patent [19]

Martusciello

[11] Patent Number: 5,388,551
[45] Date of Patent: Feb. 14, 1995

[54] CONVERTIBLE HARNESS SYSTEM

[76] Inventor: Jack Martusciello, 6540 E. Presidio, Scottsdale, Ariz. 85254

[21] Appl. No.: 148,959

[22] Filed: Nov. 8, 1993

[51] Int. Cl.$^6$ ............................................. A01K 29/00
[52] U.S. Cl. ..................................................... 119/770
[58] Field of Search ............... 119/769, 770, 855, 856, 119/792, 795; 280/290; 472/133; 297/485, 465; 182/3, 6, 7; 5/83.1, 89.1

[56] References Cited

U.S. PATENT DOCUMENTS

| | | | |
|---|---|---|---|
| 2,212,746 | 8/1940 | Nunn | 119/770 |
| 4,234,229 | 11/1980 | Arnold | 297/465 X |
| 4,428,514 | 1/1984 | Elf | 297/465 X |
| 4,508,045 | 4/1985 | Spanier | 182/7 X |
| 4,553,633 | 11/1985 | Armstrong | 182/3 |
| 4,927,211 | 5/1990 | Bolcerek | 297/465 |
| 5,076,598 | 12/1991 | Nauman | 280/290 X |
| 5,080,191 | 1/1992 | Sanchez | 182/3 |
| 5,220,976 | 6/1993 | Gunter | 182/3 |

*Primary Examiner*—Gene Mancene
*Assistant Examiner*—Thomas Price
*Attorney, Agent, or Firm*—Gregory J. Nelson

[57] ABSTRACT

A convertible harness system to be worn by a child or other person including a harness having a waist-encircling band and shoulder straps. A seat may be detachably suspended from the harness and includes a seat pad which extends between the legs of the wearer. The seat assembly may be removed for washing or in the event it is not necessary. The wearer may be guided and supported by handles or loops slidably secured to the shoulder straps. An optional tether may also be secured to the shoulder straps to restrain and control the wearer.

12 Claims, 2 Drawing Sheets

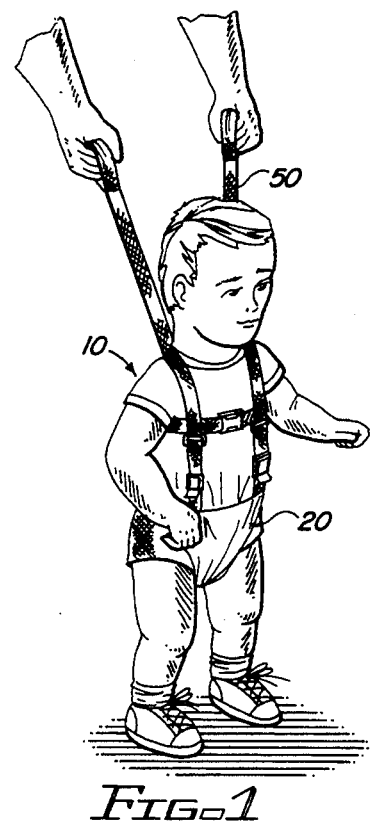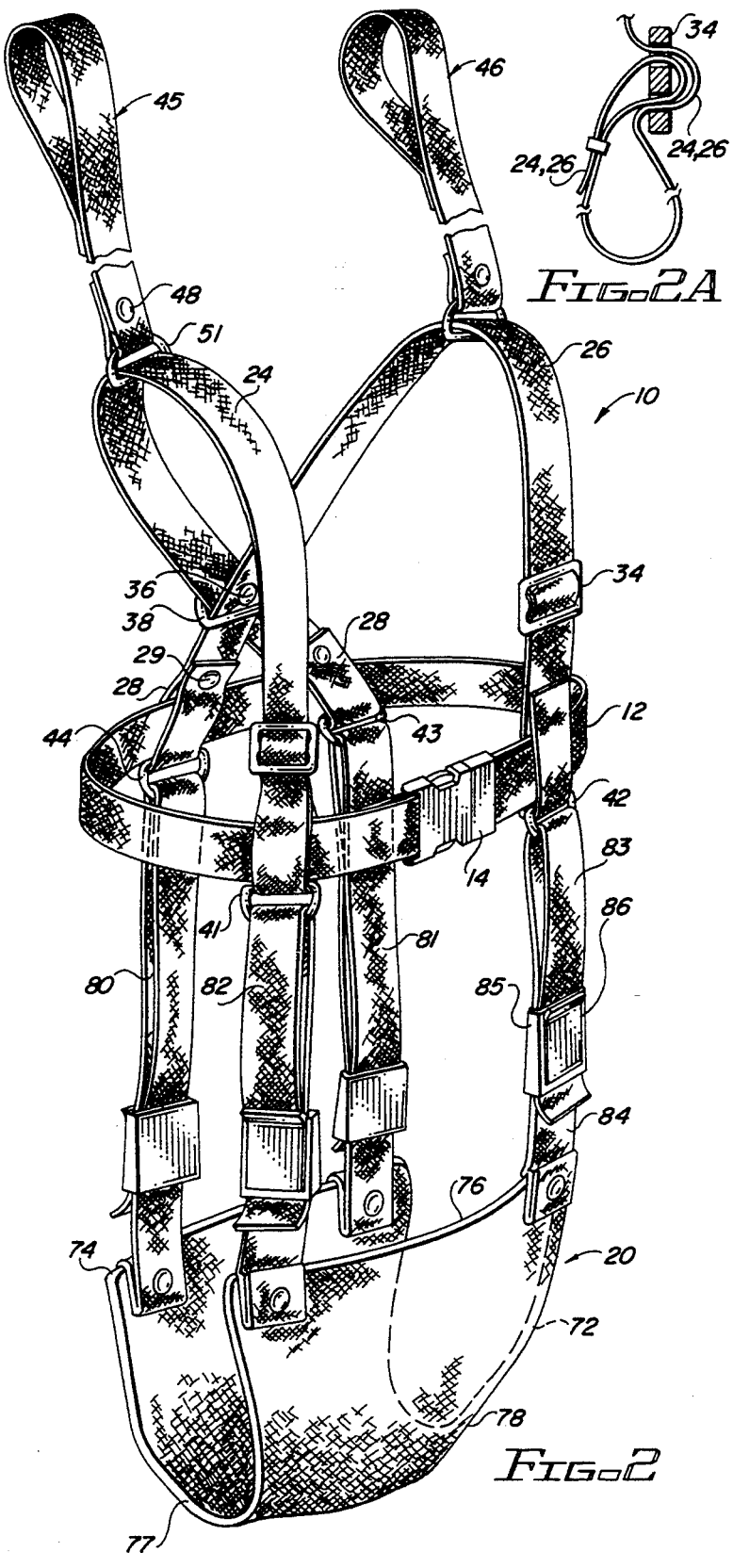

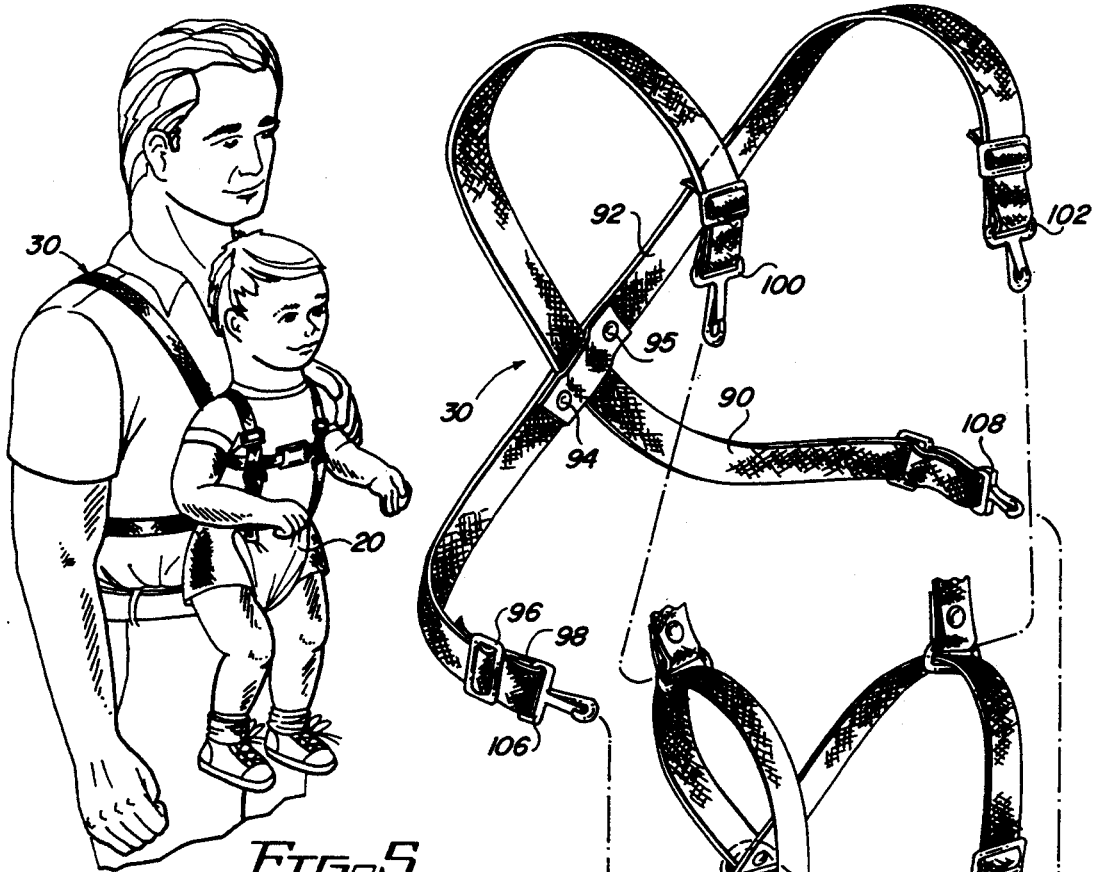
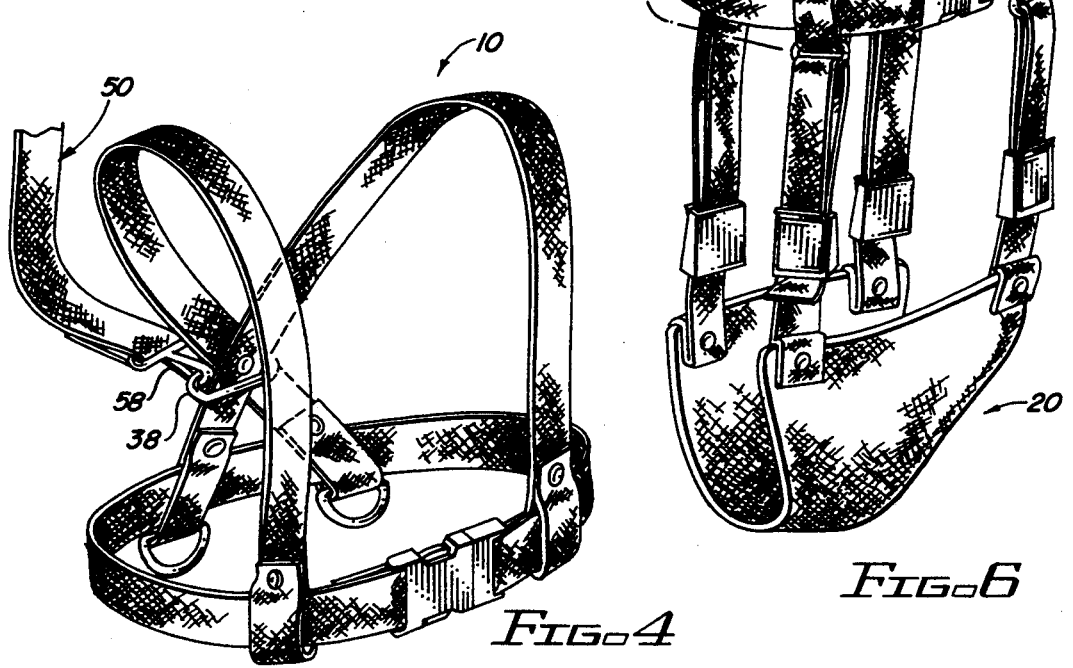

CONVERTIBLE HARNESS SYSTEM

The present invention relates to a convertible harness system and more particularly to a multi-use harness system which can be used to assist and support a child while the child is learning to walk. The harness system may also be attached to a tether to restrain the child once the child has learned to walk. The harness system may also include a carrier assembly so that the child may be supported and carried in the chest area of a parent or attendant.

Various patents can be found in the prior art which show devices for restraining child movement. For example, U.S. Pat. Nos. 1,310,958 and 2,677,488 both disclose safety harnesses for children which utilize belt and shoulder straps with restraint handles connected to the waist belt.

U.S. Pat. No. 4,981,110 discloses a baby walker which has a one-piece harness which fits over the child's torso with a front panel and a back panel interconnected by a bottom web. Shoulder straps are integrally formed on the front and back panels defining arm openings. Straps extend beyond the shoulder straps which may be grasped by an adult to assist the child in walking.

U.S. Pat. No. 5,120,287 shows an infant walking aid which has a harness mechanism which encloses and supports the infant. A first bar is adapted to be grasped by the attendant and is secured to the upper portion of the harness. A second bar is flexibly secured to the harness and is adapted to grasped by the infant during a training exercise to provide support to the child.

U.S. Pat. No. 4,922,860 shows a training harness which may be used by a child or disabled person to assist in learning or re-learning various activities such as walking, skating or swimming. The device includes an adjustable generally orthogonal strap adapted to fit around and conforming to the body of the wearer with integral handle means adapted to be held by the attendant. The strap means includes a combination of two generally vertical support straps which criss-cross the wearer and one or more cooperating chest bands which extend around the wearer's chest. The support straps each have an extension which serve as a handle means.

Thus, as indicated from the above, it is well recognized that harness arrangements are helpful as a walking aid for supporting an infant or child and that such devices allow an adult to support and assist the infant. The prior art also recognizes that such devices may also be used in the case of providing assistance to disabled or handicapped persons in therapy. These devices generally have a harness mechanism which extends over the shoulders and around the waist or upper torso of the child or person wearing the harness.

While various training devices to assist children, and in some cases adults, in walking, such devices have certain inherent limitations. Most of these devices are single-purpose devices and many of these devices are complex, unwieldy or uncomfortable in use.

In view of the foregoing, there exists a need for a simple harness arrangement which may be used both by children and adults which will assist and support the wearer while walking. Further, these exists a need for a convertible harness device of the type which may be used for other applications as for example restraining the child once the child has learned to walk or for carrying the child securely supported from a parent or attendant.

Accordingly, it is a primary object of the present invention to provide a novel convertible harness system which may be used to support and assist a child or handicapped individual during motor skill training such as walking and which device may also be utilized for other purposes such as restraining and carrying a child.

Briefly, in accordance with the present invention, a convertible harness system is provided which has as its basic component a harness which has a band which extends around the upper torso of the wearer. Two shoulder straps are attached to the waist band and crisscross at the rear of the wearer. Handle loops are provided on the shoulder straps. When used to assist a child in walking, a seat is suspended from the harness. The seat includes a soft fabric pad which extends between the legs of the child. The pad has four suspension straps which may be detachably secured to the harness by means of D-rings on the harness and adjustable seat belt-type buckles. The pad may be removed for washing or when it is desired only to use the harness portion of the system. A tether restraint strap may be secured to the rear of the harness where the shoulder straps crisscross at a D-ring provided for this purpose.

In the event it is desired that the parent or attendant carry the child, a carrier comprised of a pair of crisscross shoulder straps may be engaged over the shoulders and about the waist of the adult and attached to the harness at D-rings on the shoulder straps and waist band of the harness. One of the carrier straps may be used as the tether.

The above and other objects and advantages of the present invention will become more apparent from the following description, claims and accompanying drawings in which:

FIG. 1 is a perspective view showing a child being supported in the harness and seat portions of the system of the present invention;

FIG. 2 is a perspective view showing the harness and seat portions of the system;

FIG. 3 is a perspective view showing a small child being restrained using the harness and tether portions of the system of the present invention;

FIG. 4 is a perspective view showing the harness and tether restraint portions of the system of the present invention;

FIG. 5 is a perspective view showing a small child wearing the harness and seat portions of the system and being supported at the chest of an attendant by a carrier worn by the attendant and attached to the harness and seat; and FIG. 6 is a perspective view showing the harness, seat and carrier components of the harness system of the present invention.

The harness system of the present invention is a multiple-use device which may be used for supporting a child or person while learning motor skills such as walking and which may also be used to restrain a child and to support a child so the child may be carried by an adult. While in some applications, the harness system of the present invention may also be utilized by adults as well as children, particularly those that are disabled or handicapped, the present invention will be described with reference to use by a child, it being understood that the description applies to these other applications. Also, as used herein, the terms "front" and "rear" are used with reference to the orientation of the system when worn.

The system includes three basic components. The harness is generally designated by the numeral 10, the seat portion which is generally designated by the numeral 20 and the carrier which may be worn by an adult to support the child which is designated by the numeral 30. A tether strap may also be secured to the harness, the tether strap being designated by the numeral 50 and which may be a part of the carrier.

The basic component of the harness system is the harness 10 which is seen in FIGS. 2, 4 and 6. The harness has a belt portion 12 which is adapted to be extended around the upper torso of the child in the chest area as shown in FIGS. 1, 3 and 5. The belt is provided with a buckle 14 which allows the girth of the belt to be adjusted. The buckle 14 may be provided in the front of the device as shown in FIG. 2 or may be located at the rear of the device to make it more difficult for the child to reach the buckle. The buckle may be a conventional buckle or a quick release bayonet-type buckle commonly used.

A pair of shoulder straps 24 and 26 are each attached about the rear of the belt at loops 28 which loosely fits about the belt and is secured by a rivet 29. The belts 24 and 26 extend across one another and extend over the shoulders of the wearer as shown in FIGS. 1, 3 and 5. The front ends of each of the shoulder straps 24, 26 each extend through the adjacent openings in buckle 34 and around the front portion of the belt with the distal end being secured to the middle cross bar of the buckle as seen in FIG. 2A. In this way, each of the straps can be loosened and the buckle 34 vertically moved to adjust the effective length of the shoulder straps to accommodate the physical requirements of the child. Straps 24, 26 are preferably riveted together at rivet 36 at the location where the straps criss cross. A D-ring 38 is retained in position by the rivets 36 at this location. D-rings 41, 42, 43 and 44 are attached to the lower ends of the shoulder straps as seen in FIG. 2.

The harness portion of the harness system is completed by a pair of handles 45, 46 secured to the upper end of shoulder straps 24, 26 at D-rings 51. Each of the handles are continuous loops with their ends being secured by a rivet 48.

The harness portion 10 of the harness assembly is shown in FIG. 4 and may be placed on a child as a restraint. As shown in FIG. 3, the harness is positioned about the child with the belt 12 extending about or in the chest area of the child and with the child's arms extending between the openings defined at the sides of the harness. The shoulder straps 24, 26 are positioned extending over the shoulders of the child. A tether strap 50 carries a snap hook 58 which may be detachably secured to the D-ring 38 located at the rear of the harness. In this way, as seen in FIG. 3, an adult may allow the small child or infant to walk unassisted but may restrain the child from wandering as a safety and security device. Preferably the tether strap is obtained by separating the straps 90, 92 which constitute the carrier. Either of these straps may be used as the tether which avoids the requirement of having additional, cost-increasing components.

As mentioned above, the harness system is a multiple-use device and one of the principal uses is to assist and support a child while learning certain motor skills such as walking. When used for this purpose, the harness system includes the harness 10 as described above with the seat 20 attached. The seat 20 is best seen in FIGS. 1 and 2. The seat 20 includes a pad portion 72 which is preferably made of soft fabric and has opposite edges 74. 76 and sides 77, 78. As seen in FIG. 1, the sling extends between the legs of the child and accordingly sides 77, 78 may be contoured for comfortable fit. The rear or seat portion of the pad 72 may be pleated to fit the anatomy of the child.

The pad is detachably securable to the belt by a plurality of suspension straps 80, 81, 82 and 83. The lower end of straps 80, 81 are secured at the upper front edge 76 of the pad. Straps 82, 83 are secured at the upper rear edge of the pad. A short tab 84 carrying a buckle 85 is also secured at each of these locations. The buckle 85 is a seat belt-type buckle having a tongue 86 which can be closed to retain the strap extending thereto. Thus, the seat can be removably and adjustably secured to the harness by extending the straps 80, 81, 82 and 83 through the appropriate D-rings 41, 42, 43, 44 associated with the ends of the shoulder straps 26, 28. The vertical position of the seat 72 can be adjusted to accommodate the physical and anatomical requirements of the child. Once the seat is properly positioned, it may be locked in place by closing the tongue 86 of the closure buckles 85.

With the harness assembly assembled as shown in FIG. 2, the child may be placed with the harness about the child and with the child's legs extending from opposite sides of the seat pad. The parent or guardian can then easily assist the child who is in the learning stages of walking as shown in FIG. 1. This will allow the child to gain self confidence and overcome the fear and anxiety of a possible fall. The attendant simply grasps the loops 53 at the upper end of the shoulder straps. The loops 53 may also be used to lift the child from the floor to a bed or into a playpen or simply may be used to suspend the child while playing with the child in a swinging motion.

As indicated above, the convertible harness system of the present invention is extremely versatile and also can be used to support a child in a position against the chest of an attendant as shown in FIG. 5 when used with the carrier 30. The carrier 30 consists of a pair of straps 90 and 92 which criss cross one another. Strap 92 is provided with a loop which is formed by a strip of material 94 which is secured to the strap 92 at spaced-apart locations by rivets 95. The strap 90 passes through the loop 94. A buckle 96 is secured near the end of each of the straps 90 and 92 so that the length of the strap can be adjusted at each of those locations. The buckles 96 are similar to those seen in FIG. 2A. A loop 98 is formed at the end of each of the straps. A snap hook 100 is secured to the loop 98 at the upper end of strap 90. Snap hook 102 is secured to the loop at the upper end of strap 92. Similarly, snap hooks 104 and 106 are secured at the lower ends of straps 92 and 90, respectively.

To secure the child in a position against the body of the wearer, the child may be positioned facing the same direction of the attendant as shown in FIG. 5, or for a small child the child may be positioned facing the attendant. With the child in the desired position, snap hooks 100 and 102 are engaged at the appropriate D-rings 51, positioned on the upper end of the shoulder straps. Similarly, D-rings 106 and 108 are secured to selected D-rings 41, 42, 43 and 44 located on the lower end of the shoulder straps. If, for example, a child is positioned as shown in FIG. 5, snap hooks 106 and 108 will be secured to the D-rings 43, 44 at the rear ends of shoulder straps 24, 26. In this position, the child is safely and securely held in a convenient position for carrying by the adult.

In the event the pad of the harness becomes dirty or soiled, it may be easily removed by opening the associated buckles 8,5. The harness is preferably made from a suitable material such as nylon webbing or other synthetic material such as polyester or polypropylene which provides the necessary strength and is easily washed. With the synthetic materials as described above, the device may even be used to permit the child to engage in such activities as swimming and wading.

Thus, it will be seen that the present invention provides a simple, convenient and highly versatile child's harness. The device can be economically fabricated, conveniently packaged and provided to the consumer at reasonable cost. The versatility allows the device to be used in a number of different ways depending upon the age and ability of the child and the desires of the parent or attendant. The device is adjustable to accommodate wearers of various anatomical shapes and sizes and permit adjustment to accommodate growth of the child. When the child has become fully ambulatory, the device can be used as a tether to restrain the child for the safety and security of the child and the convenience of the parent or attendant.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A convertible harness system for use with a child by an attendant comprising:
   (a) a harness including:
      (i) a body encircling-band having a front and rear;
      (ii) a pair of shoulder straps attached to said band and extending from the front to the rear of said band; and
   (b) a seat assembly including:
      (i) a soft seat pad contoured to fit between the legs of the wearer and support the wearer, said seat pad having a front edge, a rear edge and opposite side edges and extending in the crotch area of the wearer; and
      (ii) straps extending from the seat pad and each strap having means for detachably securing said seat pad to said harness whereby said seat pad may be removed from said harness.

2. The harness assembly of claim 1 further including a tether detachably secured to said harness.

3. The harness assembly of claim 1 wherein said band inches an adjustable buckle.

4. The harness of claim 1 wherein said harness includes a plurality of D-rings and wherein said straps extending from said seat are detachably securable to said D-rings and include an adjustable quick-release fastener.

5. The harness of claim 1 wherein said shoulder straps extend across the back of the wearer in criss-cross fashion and wherein a D-ring is secured to said straps in the area where said straps criss cross.

6. The harness of claim 1 wherein said seat pad is a soft fabric and said opposite side edges are contoured to fit the anatomy of the wearer.

7. The harness of claim 1 further including a carrier having a pair of straps which are extendible about the torso of an attendant and which have fasteners detachably securable to said harness to secure a child at the torso of the attendant.

8. The harness of claim 7 wherein said one of said carrier straps comprises a tether detachably securable to at least one of the shoulder straps.

9. The harness of claim 1 wherein said straps are webbing of a fabric of a synthetic resin.

10. A convertible harness system for supporting the body of the wearer, said harness assembly comprising:
   (a) a harness having a body-encircling band having a front and rear and having a releasable closure;
   (b) a pair of shoulder straps each slidably secured to the rear of the band and extending over the shoulders of the wearer and being slidably attached to the front of said band in a use position, said shoulder straps including adjustment means for adjusting the length of said shoulder straps;
   (c) a seat assembly including a soft fabric seat pad having opposite side edges and front and rear edges, said seat pad being adapted to extend between the legs of the wearer and providing support to the wearer, said seat pad assembly including suspension straps extending from the front and rear edges of said seat pad and including releasable fastener means thereon, whereas said suspension straps may be detachably secured to the harness and adjustably secured at said fastener means and whereby said seat may be removed.

11. The harness system of claim 10 wherein said straps and belt are fabricated from a webbing of a fabric of a synthetic resin.

12. The harness system of claim 10 further including a tether detachably securable to the harness.

* * * * *